June 11, 1935.　　J. R. VANDEVER　　2,004,452
CHEMICAL HEATER FOR OIL WELLS
Filed June 20, 1934
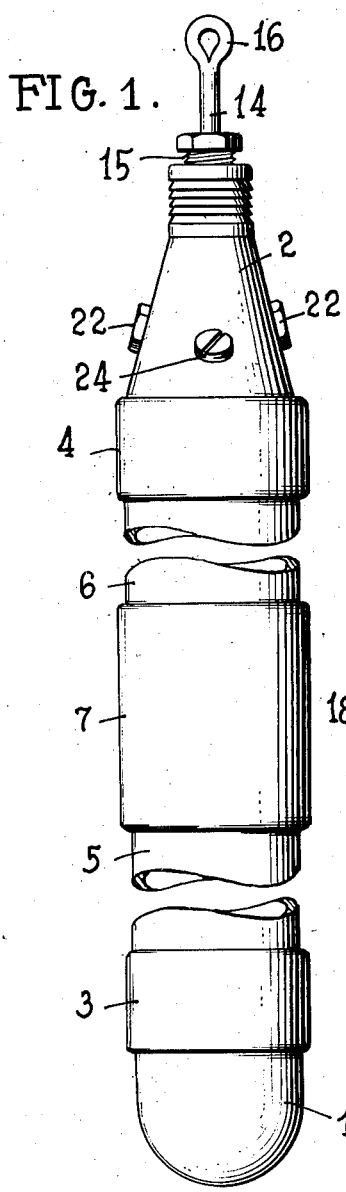
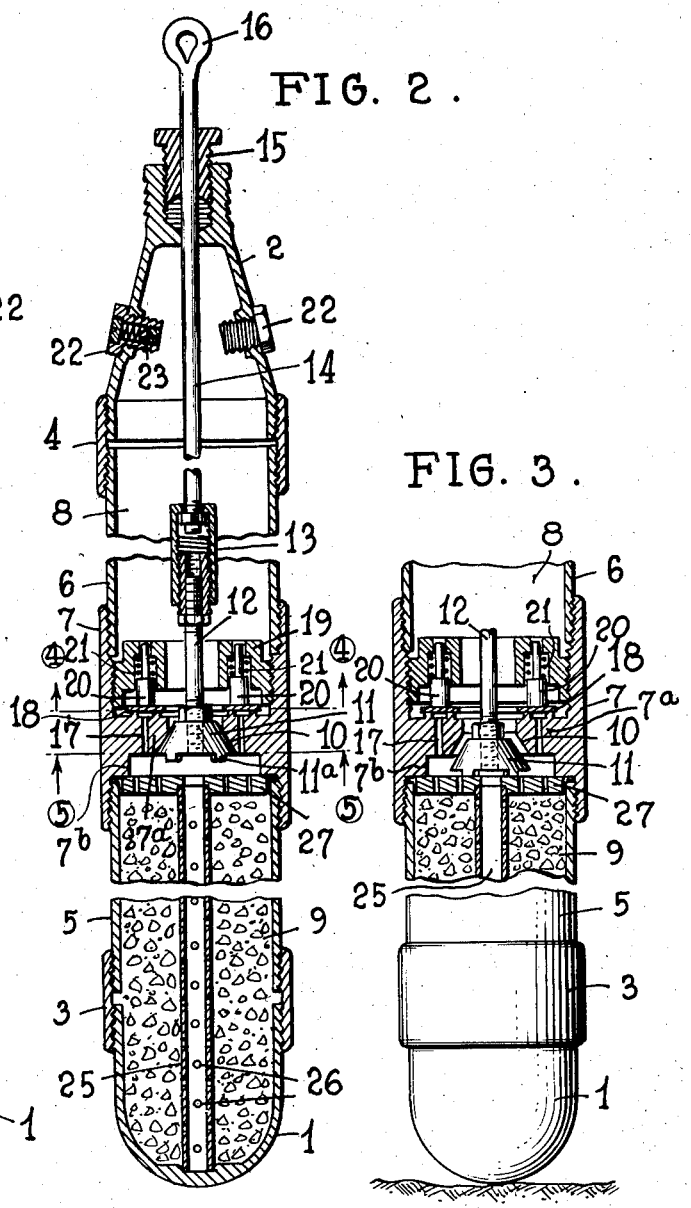
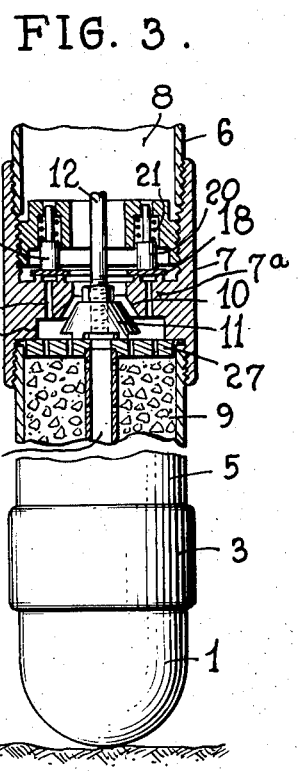
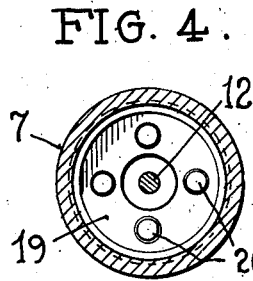
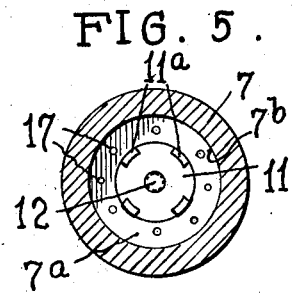
Inventor
JAMES R. VANDEVER
Stone Boyden & Mack
Attorneys Patented June 11, 1935

2,004,452

UNITED STATES PATENT OFFICE 2,004,452

CHEMICAL HEATER FOR OIL WELLS

James R. Vandever, Pampa, Tex., assignor to Richard P. Abele, Tulsa, Okla., as trustee Application June 20, 1934, Serial No. 731,537

11 Claims. (Cl. 166—17)

This invention relates to heaters for use in oil wells. More particularly it relates to that general class of heaters which are adapted to be lowered into an oil well to the level of the oil producing strata and which serve to melt paraffine and other solidified petroleum materials which, in many cases, materially limit the productivity of a well.

It has been well recognized that due to some conditions, the passageways and fissures through which the oil seeps into the well from the surrounding strata become clogged with paraffine and other solidified petroleum materials.

In numerous instances, it has been found that such materials can be melted and drained off by the direct application of heat to the walls of the well at the level where the oil drains into the well, thus serving to increase substantially the productivity of the well.

It has been found that in order to produce beneficial results, it is necessary to apply considerable heat directly to the walls of the well and it is also essential that the heat applied must be of such nature that it will not burn the crystalline face of the producing formation.

It is an object of this invention to provide safe and relatively simple apparatus for applying this heat to the walls of the well in the oil producing formation, which will be sufficiently simple so that it may be effectively handled by the ordinary field worker in oil fields.

Through the use of the heater herein described, it is possible to generate this heat at the bottom of the hole or in the producing formation itself with no risk whatsoever to the crew using the heater or to the producing formation itself.

The substances through which the heat is generated are confined to the heater itself, and when the substances have expended themselves, the heater can be removed from the hole and the paraffine and other material which has been liquefied can be bailed from the well or can be removed from the well by pumping.

A further object of the invention is to provide a completely closed housing containing chemicals which, when brought into contact with each other, will produce an exothermic reaction, the housing being capable of releasing excess gas pressure without releasing active chemicals into the well.

Still further, the invention contemplates the provision of apparatus for bringing the chemicals into contact with each other when the housing has been lowered to the bottom of the well.

Yet another object of the invention consists in novel and distinctive arrangement of the internal parts of the housing in order that a maximum of surface of the chemical may be exposed to the action of the fluid which produces the reaction in order that the entire charge may be efficiently used.

Still further, the invention contemplates the provision of check valves in the housing which permit the escape of steam and other gases resulting from the reaction but prevent access to the interior of the housing of oil or other foreign matter existing in the well.

Many other and further objects and advantages of the invention will become apparent from a consideration of the following specification when considered in connection with the accompanying drawing. It will be understood that the specific embodiment of the invention herein shown is merely illustrative of one form of the invention and that the structure may be materially modified without departing from the generic spirit of the invention as defined in the subjoined claims.

In the drawing:

Fig. 1 is a side elevation of the improved housing, broken away between the center portion and both ends;

Fig. 2 is a vertical sectional view of the housing showing the interior arrangement of parts with the main valve in the closed position;

Fig. 3 is a view of the lower end of the housing, partly in section, illustrating the main valve controlling communication between the two chambers in the open position; and Figs. 4 and 5 are transverse sections taken on the lines 4—4 and 5—5 respectively of Fig. 2, looking in the direction of the arrows.

With more particular reference to the drawing, the heater comprises a housing which includes tapered or rounded end members 1 and 2. Each of these end members are connected by means of suitable coupling sleeves 3 and 4 to substantially cylindrical body members 5 and 6 respectively.

The members 5 and 6 may be of any desired length, depending on the size of the particular charge which it is desired to use in the heater, and the length may be varied, depending upon the vertical area of the oil well wall which it is desired to heat.

The members 5 and 6 are joined together by a union element 7, into which each of these members may be threaded. The coupling element 7, as is seen in Figs. 2 and 3, provides a partition wall 7ª extending across the bore and serves to divide the housing into separate upper and lower closed chambers 8 and 9. Centrally disposed in the partition wall 7ª is a conical valve seat 10, which receives a vertically reciprocable valve 11, serving to control communication between the chambers 8 and 9.

The valve 11 has a stem 12 connecting to an adjustable coupling 13, which in turn is connected to a valve operating rod or support rod 14. The connection of the coupling 13 with the rod 14 provides a limited universal movement between the other and permits rotation of the valve rod 12 and the various parts of the coupling 13 with respect to the support rod 14.

The support rod 14 extends substantially axially upward through the center of the chamber 8, and out through a packing gland 15 at the upper end of the housing. This rod is provided at its upper end with a suitable eye 16, which serves as a convenient means of attaching a cable by which the housing may be lowered into the well.

It will be seen from the foregoing that as the housing is lowered into the well, the weight of the housing serves to maintain the valve 11 in firm engagement with its seat 10, thus preventing any communication between the chambers 8 and 9. However, as is seen in Fig. 3, when the housing has been lowered to the bottom of the well, the weight of the housing will no longer be supported by the rod 14, and the valve 11 will become disengaged from its seat.

Surrounding the valve seat 10 in the partition casting 7 are an annular series of ports 17 providing passageways from the chamber 8 into the chamber 9. These ports are normally maintained closed by an annular check valve ring 18 engaging the surface of the partition casting on the upper side.

An annular casting 19 is mounted in the coupling element 7 and serves to provide seats for an annular series of plungers 20, which are forced by means of compression coiled springs 21, into engagement with the upper surface of the check valve ring 18. It will therefore be seen that the annular check valve 18 serves to prevent communication between the chambers 8 and 9 unless the pressure in the chamber 9 is substantially greater than that in the chamber 8.

In the tapering end portion 2 of the housing are provided a pair of check valves 22, which may be of the conventional ball type having a spring pressed ball 23 serving to normally close an aperture. It will be seen that these check valves prevent any of the fluid material within the well from entering the chamber 8 of the housing but permit the escape of gas from the housing when the pressure in the housing has been increased beyond a predetermined point. Also in the tapering member 2 is a removable filler plug 24 serving to close a suitable aperture through which the chamber 8 may be filled with fluid.

The lower chamber of the housing is adapted to contain a chemical such as lime, carbide, metallic sodium, metallic potassium or sodium or potassium hydroxide. Any suitable chemical may be used which, when exposed to the action of a liquid, will generate a considerable amount of heat. The chamber 9 is provided with an axially disposed substantially centrally mounted tube 25 having numerous perforations 26 in the wall thereof, in order that the chemical used may be packed in an annular layer between the walls of the tube 25 and the walls of the chamber 9. In order to maintain the chemical in position in the chamber 9, a perforated cover member 27 may be mounted upon the upper end of the tube 25 covering the surface of the chemical between the walls of the tube and the walls of the chamber. This cover plate 27 serves to support the valve 11 and limit its movement when the housing reaches the bottom of the well, and it will be noted that the valve 11 is provided with a plurality of axially extending lugs 11ª, which rest upon this cover plate, as is seen in Fig. 3. These lugs 11ª provide openings through which fluid from the chamber 8 may flow into the axially extending tube 25, and hence come in contact with the chemical contained in the chamber 9 throughout a relatively large surface area, in order that the reaction may be expedited.

In the operation of the heater, the members 1, 3 and 5 may be unscrewed from the coupling element 7 as a unit and the annular space in the chamber 9 between the outer walls of the tube 25 and the walls of the chamber may be filled with a suitable chemical. The cover plate 27 is then fitted onto the upper end of the tube 25 and the member 5 tightly screwed into the coupling 7. As is seen in Fig. 2, the overhanging wall 7ᵇ of the coupling 7 serves to maintain the cover plate 27 firmly in place. Tension is then exerted on the valve support rod 14, in order to seat the valve 11 firmly against the seat 10, and prevent communication between the upper chamber 8 and the lower chamber 9.

The filler plug 24 is then removed, and the upper chamber filled with water or other suitable liquid which will react with the particular chemical contained in the lower chamber 9 to produce the required heat reaction. It will be seen, however, that at the time the chamber 8 is filled with liquid, the valve 11 is firmly in contact with its seat 10, thus preventing any of the liquid in the chamber 8 from coming in contact with the chemical of the chamber 9.

A suitable cable is then secured to the eye 16 of the support rod 14 and the entire housing is lowered into the well. As is seen in Fig. 3, when the housing reaches the bottom of the well, the weight of the housing will no longer serve to maintain the valve 11 in engagement with its seat 10 and the liquid in the upper chamber 8 will be permitted to flow downwardly into the lower chamber 9, flowing through the apertures in the cover plate 27 and downwardly into the tube 25 and outwardly through the apertures 26 into contact with the annular layer of chemical.

The contact of the liquid with the chemical will produce heat sufficient to raise the temperature of the entire housing materially, and will provide sufficient heat to melt the paraffine in the surrounding oil producing formation. As it is probable that considerable steam and gas will be generated as the reaction takes place, sufficient pressure in the lower chamber may be developed to force the valve 11 into engagement with its seat 10. However, this gas will be permitted to escape through the ports 17 into the upper chamber 8, due to the action of the annular check valve ring 18. It will further be seen that such pressure as may accumulate in the upper chamber 8 may be released through check valves 22 into the well, thus escaping.

It is clearly apparent from the foregoing that however violent the chemical reaction as a result of the liquid coming in contact from the chemical may be, the pressure in the housing, due to the action of the check valves 18 and 22, is not permitted to exceed a predetermined amount dependent upon the adjustment of the various check valves.

After the oil producing formation around the well has been heated, as desired, the entire housing may be withdrawn from the well and the liquefied petroleum products melted by the heat applied may be bailed or pumped from the well.

I claim:

1. A heater for oil wells comprising a closed housing adapted to be lowered into a well, a partition dividing said housing into two separate chambers, a valve in said partition, said valve being maintained in engagement with its seat by the weight of said housing and means for opening said valve when the bottom of said well is reached.

2. A heater for oil wells comprising a closed housing containing two separate chambers, means for lowering said housing into a well to be heated, and a valve for controlling communication between said chambers having a stem connected to said lowering means to retain said valve in engagement with its seat as the housing is lowered whereby communication between said chambers is established when said housing reaches the bottom of said well.

3. A heater for oil wells comprising a relatively long cylindrical casing divided transversely to form an upper and a lower closed chamber, check valves allowing the passage of fluid from the lower chamber into the upper chamber, and a valve controlling communication between said chambers.

4. A heater for oil wells comprising a relatively long closed housing adapted to be lowered into an oil well, a partition dividing said housing into separate upper and lower closed chambers, said lower chamber having an axially disposed perforated passage therethrough, said passage forming together with the walls of said lower chamber a space adapted to receive a chemical, and means for admitting fluid from said upper chamber into said passageway and thence into said annular space.

5. A heater for oil wells comprising a housing adapted to be lowered into an oil well, a partition dividing said housing into separate upper and lower chambers, a valve seat in said partition, a valve adapted to cooperate with said seat to control communication between said chambers, and means associated with said valve for lowering said housing in a well whereby the weight of said housing serves to maintain said valve in engagement with said seat during lowering.

6. A heater for oil wells comprising a relatively long cylindrical housing adapted to be lowered into an oil well, a partition dividing said housing transversely into separate upper and lower chambers, a valve for controlling communication between said chambers located substantially centrally of said partition, means for opening said valve when said housing reaches the bottom of a well, and an annular check valve in said partition surrounding said first mentioned valve to allow gas to pass from said lower chamber into said upper chamber.

7. A heater for oil wells comprising a relatively long cylindrical housing adapted to be lowered into a well, a partition dividing said housing into separate upper and lower chambers, a valve in said partition for admitting fluid from said upper chamber into said lower chamber, a check valve in said partition, and a check valve in the wall of said upper chamber.

8. A heater for oil wells comprising a housing adapted to be lowered into an oil well, a chemical in said housing, a fluid within said housing which when brought into contact with said chemical will produce an exothermic reaction, a valve normally preventing contact between said fluid and said chemical, and means for opening said valve when said housing reaches the bottom of a well.

9. A heater for oil wells comprising closed housing adapted to be lowered into a well, a chemical within said housing, a fluid also within said housing which when brought into contact with said chemical will produce an exothermic reaction, means normally preventing contact of said fluid with said chemical, means for bringing said fluid into contact with said chemical when said housing reaches the bottom of a well, and a check valve adapted to liberate gaseous products from said housing.

10. An oil well heater comprising a housing having chambers adapted to contain materials which when brought into contact will produce an exothermic reaction, a valve controlling communication between said chambers, means for supporting said housing while it is being lowered into a well, said means connected to said valve whereby said valve remains closed while said housing is being lowered and is automatically opened when said housing reaches the bottom of a well.

11. An oil well heater comprising a housing having chambers adapted to contain materials which when brought into contact with each other will produce an exothermic reaction, a valve for controlling communication between said chambers, said valve having an operating rod passing through a gland in said housing, said operating rod serving to support said housing as it is lowered into a well whereby the weight of said housing maintains said valve closed during lowering.

JAMES R. VANDEVER.